March 24, 1970  O. BEESCH  3,502,055
COMBINED SPARKPLUG AND FUEL-INJECTION DEVICE
Filed Aug. 5, 1968
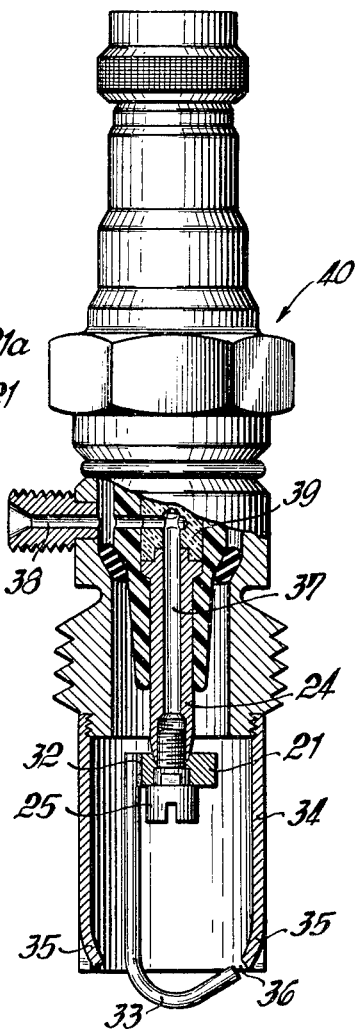
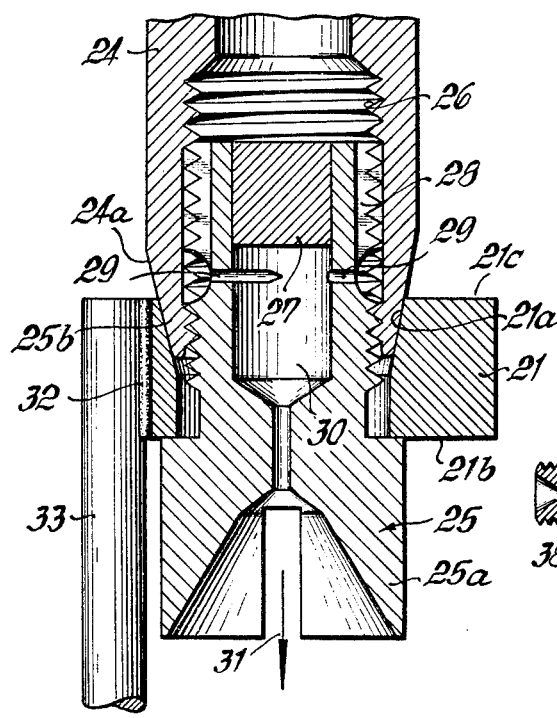
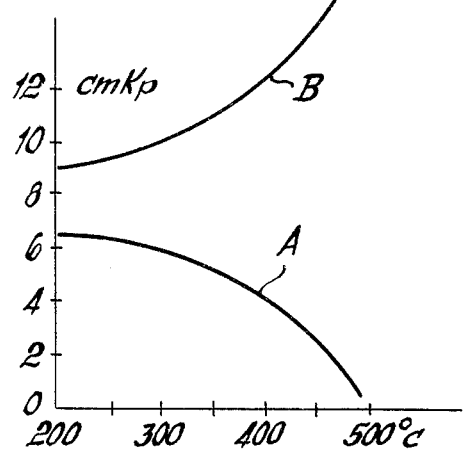
INVENTOR
Otto BEESCH
BY
Michael S. Striker
his ATTORNEY United States Patent Office 3,502,055
Patented Mar. 24, 1970

3,502,055
COMBINED SPARKPLUG AND FUEL-INJECTION DEVICE
Otto Beesch, Heinestrasse 131, Stuttgart-Sonnenberg, Germany
Continuation-in-part of application Ser. No. 561,854, June 30, 1966. This application Aug. 5, 1968, Ser. No. 750,359
Claims priority, application Germany, July 10, 1965, B 82,786
Int. Cl. F02p *23/00, 1/00, 13/00*
U.S. Cl. 123—32
12 Claims

ABSTRACT OF THE DISCLOSURE

In a combined sparkplug and fuel-injection device a tubular outer electrode surrounds an inner electrode assembly consisting of a member provided with an axial bore, a bolt-shaped nozzle element threaded into the bore and being provided with an axial passage which communicates with the bore and which has an outlet located outside the same, and a compression ring surrounding a portion of the member in the region where the nozzle element is threaded into the bore thereof. The compression ring is in engagement with the nozzle element, and the inner surface of the compression ring and the outer surface of the member are provided with complementarily tapers so that, when the nozzle element is threaded deeper into the bore, the member will be drawn deeper into the compression ring with resulting radial compression of the member and compression of the threads in the bore and on the nozzle element into engagement with one another.

CROSS REFERENCE TO RELATED APPLICATIONS

The present application is a continuation-in-part of my copending application, Ser. No. 561,854, entitled "Sealing Arrangement" and filed on June 30, 1966.

BACKGROUND OF THE INVENTION

The present invention relates to a combined sparkplug and fuel-injection device.

In devices of this type the sparkplug and the device for effecting fuel-injection are combined into a unit. The fuel advances through a suitable passage means provided in this unit, and more specifically through suitable passage means provided in the sparkplug structure and thereupon into an injecting nozzle from which it issues to be there-after ignited. Of course, the injecting nozzle must be suitably connected with the body of the sparkplug structure so that the fuel cannot escape prematurely, that is prior to reaching the outlet of the injecting nozzle. It is known to provide a screw-threaded connection between the body of this sparkplug and the fuel-injection device, that is the injection nozzle, but this has not been found entirely satisfactory because, due to the temperature fluctuations and extreme vibrations which such devices are subjected in operation of the engine with which they are used, for instance in the automotive industry, such screw-threaded connections have a tendency to become loosened and thus to permit undesired escape of fuel.

It is thus a general object of the present invention to overcome these disadvantages set forth above.

A more particular object of the present invention is to provide a combined sparkplug and fuel-injection device which is not subject to these disadvantages.

A further object of the invention is to provide such a device which is very simple to construct and to assemble, and which is highly reliable in operation. However, a concomitant object of the invention is to provide such a device which is inexpensive to manufacture and requires a minimum of components.

SUMMARY OF THE INVENTION

In pursuance of the above objects, and others which will become apparent hereafter, one feature of my invention resides in the provision of a structure constituting a combined sparkplug and fuel-injection device. This structure includes a combination which comprises first means in turn including a tubular outer electrode, and second means arranged at least partly within the confines of the first means and comprising an assembly constituting an inner electrode. This assembly includes an elongated electrically conductive tubular first member having an outer surface and an axially extending tapped bore having an open end and being adatped for passage for a combustible fluid therethrough.

A nozzle element, including an externally threaded shank and a head carried by said shank, is provided with the shank extending into the open end of the bore and meshing with the threads therein and with the head being located exteriorily of the bore. The nozzle element has an axial passage communicating with the bore and comprising an outlet in the head from which the combustible fluid issues.

An electrically conductive element is conductively associated with the tubular first member and has an end portion which defines in the path of fluid issuing from the outlet a spark gap with the tubular outer electrode.

An annular second member surrounds the first member in the region of the open end of the tapped bore thereof and has an inner surface. One of the surfaces just mentioned has a first portion tapering axially in a predetermined direction and the other of these surfaces has a complementarily tapered second portion in engagement with the first portion. The second member is in engagement with the head of the nozzle element in a sense resulting in relative axial displacement of the first and second members, and in concomitant radial compression of there screw threads in the tapped bore into sealing engagement with the threads of the shank, in response to threading of the shank deeper into the tapped bore. Thus, undesired loosening of the nozzle element from the first member is prevented.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a perspective view, partly in axial section, of a combined sparkplug and fuel-injection device embodying my invention;

FIG. 2 is an axially section fragmentary detailed view of FIG. 1, on an enlarged scale; and FIG. 3 shows in graphic form the torque required for loosening the screw-threaded connection between certain components of the embodiments illustrated in FIGS. 1 and 2.

DESCRIPTION OF THE PREFERRED EMBODIMENTS

Discussing now the drawing in detail, and firstly FIG. 1 therefore, it will be seen that I have illustrated therein by way of example a combined sparkplug and fuel-injection device embodying my invention. This device is generally indicated with reference numeral 40 and may be of the type utilized in gas turbines or the like. Details which are of no importance for the purpose of the present invention have not been specifically identified so as not to detract from the clarity of illustration of the inventive concept. In FIG. 2 I have shown on an enlarged scale certain portions of the device of FIG. 1.

Reference to FIGS. 1 and 2 will show that the device 40 includes first means which defines at the front end of the device a tubular outer electrode 34. Second means is arranged at least partly within the confines of the tubular outer electrode and constitutes an inner electrode. This second means includes an assembly composed of a tubular first member 24 having an axially extending bore 37 therein. At its rear end the bore 37 communicates with a bore 38 extending at right angles to the bore 37 and provided in an electrically conductive plug 39 of vitreous material which serves as a gas-type contact material and which is incorporated within the body of the device 40 by melting prior to drilling of the bores 37 and 38. It will be noted that the bore 37 is extended beyond the rear end of the first member 24 to the plug 39 to meet therein with the bore 38. The plug 39 further serves to hold the first member 24 in position.

The forward or front end of the bore 37 in the first member 24 is tapped, that is it is internally screw threaded as indicating with reference numeral 26; the remainder of the interior of the bore 37 may be smooth.

A suitable insulating sleeve surrounds the first member 24 of a portion of its axial length, and is in turn surrounded by an external housing portion. Neither the insulating sleeve nor the external housing portion are of importance for the purposes of the present invention and are therefore not described in greater detail although they have been shown in the drawing for the sake of completeness.

Threaded into the tapped front end of the bore 37 is a fuel-injection element which is generally identified with reference numeral 25 and which comprises, as more clearly shown in FIG. 2 a head 25a configurated in known manner as a spray nozzle and an externally screw-threaded shank 25b. It is the shank 25b which is threaded into the tapped bore 37 so as to mesh with the screw threads 26 provided therein. The member 25 is provided with a central bore extending axially through the shank and terminating in a diverging recess (see FIG. 2) provided in the head 25a. The inner end of the bore in the element 25, that is the upstream end of this bore, is closed by a plug 27, and the external threads provided on the shank 25b are formed with two elongated laterally located slots 28 communicating with tangential bores 29 which are offset with respect to one another and which communicate with that portion of the central bore in the element 25 which is unobstructed by the plug 27. This portion is identified with reference numeral 30 and constitutes an atomizing chamber for fuel which, entering through the bores 38 and 37, passes through the slots 28 and the tangential bores 29 into this atomizing chamber 30 to leave it in direction of the arrow 31 so as to issue as a spray from the diverging recess in the head 25a of the element 25.

The forward or front end of the first member 24 is located within the confines of the outer electrode 34, as shown in FIG. 1. In the illustrated embodiment it has an outer circumferential surface portion 25a which tapers in forward direction. An annular second member 21 surrounds the tapering surface portion 24a of the first member 24; it has an inner surface 21a a portion of which has a taper complementary to that of the surface portion 24a which it engages exteriorly thereof. The second member 21 further has an axial end face 21b facing forwardly, that is in downstream direction of the fluid flow, and another axial end face 21c facing rearwardly, that is in upstream direction of the fluid flow. As clearly evident from FIGS. 1 and 2 an electrically conductive element 33 constituting an electrode is suitably secured to the member 21, in the illustrated embodiment by means of a weld 32. This is of course only an exemplary illustration because other securing means will be readily evident to those skilled in the art. The member 21 is electrically conductive, as is the member 24. A free end of the member 33 is so arranged (compare FIG. 1) as to confront one of the two mass electrodes 35 which are constituted by portions stamped and bent out from the tubular outer electrode 34. Between the free end of the member 33 and the mass electrode 35 which it confronts, there is established the spark gap 36.

In operation of the device shown in FIGS. 1 and 2 my novel construction undergoes significant temperature fluctuations as well as strong vibratory stresses. It is, of course, necessary to assure that none of the fluid advancing through the bore 37 can escape between the cooperating screw threads provided at the exterior of the shank 25b and the interior at the front end of the bore 37. Because of temperature fluctuations, and the resulting varying thermal expansion contraction of the individual components involved, and because of the vibratory motions to which this device is constantly subjected, there is a tendency for the element 25 to become loosened from the member 24, it being well known that under the just-mentioned circumstances the cooperating screw threads have a tendency to work loose from one another. This would then permit leakage of fuel between the cooperating screw threads of the bore 27 and the shank 25b and this is a problem which heretofore has always been encountered of devices of this general type here under discussion.

My invention, however, avoids this, it being evident that in the illustrated embodiment the axial end face 21b of the member 21 is in engagement with the head 25a of the element 25. It is clear that as the element 25 is threaded into the tapped portion of the bore 27 of the member 24 during assembly of the device 40, the head 25a will push against the axial end face 21b and thus tend to advance the member 21 axially inwardly along the member 24, or putting this conversely, to draw the member 24 deeper into the member 21. This is so because of the complementary tapers on the surface portions 24a and 21a of the members 24 and 21, respectively. As a result of this, the member 21 will effect radially inwardly directed compression of the front end portion of the member 24, thus compressing the internal screw threads 26 in the front end portion of the bore 27 into tight engagement with the external screw threads provided on the shank 25b. This prevents accidental and undesired loosening of the elements 25, particularly if the components involved are axially stressed by being so configurated that even on maximum possible penetration of the member 25 into the bore 27 the front end of the member 24 will always be out of engagement with the head 25a of the element 25. By making the length of the shank 25b at least equal to the axial distance between the end faces 21b and 21c of the member 21, I assure that when the front end portion of the member 24 is subjected by the member 21 to radially inwardly directed compression, the front portion of the first member 24 will be internally supported against collapse by the presence of the shank 25b.

My novel combined sparkplug and fuel-injection device is highly reliable even under the adverse operating conditions in which it will be normally used and in which it will be subjected to considerable vibrations and thermal fluctuations of significant magnitude. A highly advantageous feature of my device is the fact that the torque which is required for releasing the element 25 and the member 21 from the member 24, but is for unthreading the member 25 out of the bore 27, increases as the temperature of the components of the device increases. This is shown graphically in FIG. 3 where two devices of this general type are compared with one another. The bottom curve A shown in FIG. 3 indicates the torque required for releasing the equivalent of the element 25 in a prior-art construction in which a segmented copper sealing ring has been used for effecting a seal between the fuel pipe (the equivalent of the number 24) and the equivalent of the element 25. Such construction are known from the prior art and believed to require no detailed discussion. It need simply be pointed out that the initial assembly of such known constructions requires at room temperature a torque of 8 cm. kp. It will be seen that as the temperature increases, the torque required for releasing the connection between the components involved decreases significantly, as indicated by the curve A. On the other hand, the curve D of FIG. 3 indicates the conditions encountered with a device according to the present invention, for example as illustrated in FIGS. 1 and 2. Here, again, the element 25 is initially connected with the member 24 at 8 cm. kp. at room temperature. However, the curve B indicates that the torque required for releasing the components increases significantly as the temperature of the components increases. In view of the fact that during operation of the type of device here in question elevated temperatures coincide with increased vibrations, it being well known that the vibrations of an engine increase as the requirements are placed on the engine increase, which in turn results in an increase of the operating temperature, any increase in the torque required for releasing the components of my novel device from one another is highly advantageous.

Of course, devices of this type undergo temperature fluctuations very frequently and in accordance with a further feature of my invention I have found it to be advantageous if the various components, such as the members 21 and 24 and the element 25, are made of materials which have either identical or substantially identical coefficients of thermal expansion. I have found chrome-nickel steel particularly advantageous.

Of course, various modifications of the exemplary embodiment illustrated in FIGS. 1 and 2 will offer themselves to those skilled in the art. For example, as long as the cross-sectional area of the aperture in the member 21 converges in the direction towards the axial end face 21b it is conceivable to eliminate the forwardly tapering surface portion 24a of the member 24. Conversely, it is conceivable to have the surface portion 24a configurated as shown in the drawing and to have the aperture in the member 21 be of constant cross-section. Also, at least the end portion of the member 24 on which the tapering surface portion 24a is provided could be of material which is softer than the material of the member 21.

It will be understood that each of the elements described above, or two or more together, may also find a useful application in other types of constructions differing from the types described above.

While the invention has been illustrated and described as embodied in a combined sparkplug fuel-injection device, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. In a structure constituting a combined sparkplug and fuel-injection device, the combination comprising first means including a tubular outer electrode, and second means arranged at least partly within the confines of said first means and comprising an assembly constituting an inner electrode, said assembly including an elongated electrically conductive tubular first member having an outer surface and an axially extending tapped bore having an open end and being adapted for passage of a combustible fluid therethrough; a nozzle element, including an externally threaded shank extending into said open end of said bore and meshing with the threads therein, and a head carried by said shank exteriorily of said bore, said nozzle element having an axial passage communicating with said bore and comprising an outlet in said head from which the combustible fluid issues; an electrically conductive element conductively associated with said tubular first member and having an end portion defining in the path of fluid issuing from said outlet a spark gap with said tubular outer electrode; and an annular second member surrounding said first member in the region of said open end and having an inner surface, one of said surfaces having a first portion tapering axially in a predetermined direction and the other of said surfaces having a complementarily tapered second portion in engagement with said first portion, said second member being in engagement with said head in a sense resulting in relative axial displacement of said first and second members, and concomitant radial compression of the screw threads in said tapped bore into sealing engagement with the threads of said shank, in response to threading of said shank deeper into said tapped bore to thereby prevent undesired loosening of said nozzle element from said first member.

2. In a structure as defined in claim 1, wherein said second member is electrically conductive, and wherein said element is mounted on said second member in electrically conductive relationship therewith.

3. In a structure as defined in claim 1, wherein said annular second member is circumferentially complete.

4. In a structure as defined is claim 1, wherein said one surface is said inner surface of said second member.

5. In a structure as defined in claim 1, wherein said second member has a first axial end face facing opposite said predetermined direction, and a second axial end face; and wherein said head is adapted to engage said second axial end face of said second member in abutting relationship.

6. In a structure as defined in claim 1, wherein said first member is circumferentially complete.

7. In a structure as defined in claim 1, wherein said first and second members both consist of metallic material.

8. In a structure as defined in claim 1, said structure being subject to the influence of elevated temperatures of varying magnitude; and wherein at least said first and second members consist of material having a low coefficient of thermal expansion whereby to counteract relation of said radial compression due to thermal expansion of said members.

9. In a structure as defined in claim 1, said structure being subject to the influence of elevated temperatures of varying magnitude; and wherein at least said first and second members consist of material having substantially identical coefficients of thermal expansion whereby to counteract relation of said radial compression due to thermal expansion of said members.

10. In a structure as defined in claim 5, wherein the length of said shank at least equals the axial distance between said first and second end faces of said second member so that, when first member is subjected to radial compression in response to threading of said shank deeper into said tapped bore, said first member will be internally supported by said shank against collapse.

11. In a structure as defined in claim 1, wherein said second member consists of a material which is harder than the material of said first member.

12. In a structure as defined in claim 1, wherein the taper of said first and second positions is on the order of 15°.

References Cited

UNITED STATES PATENTS

| | | | |
|---|---|---|---|
| 2,008,803 | 7/1935 | Stephan. | |
| 2,229,063 | 1/1941 | Field | 123—169 XR |
| 3,173,409 | 3/1965 | Warren | 123—169 |

LAURENCE M. GOODRIDGE, Primary Examiner

U.S. Cl. X. R.

123—143, 169